United States Patent
Kifer et al.

(10) Patent No.: US 11,309,765 B2
(45) Date of Patent: Apr. 19, 2022

(54) ELECTRIC MOTOR HAVING A MOTOR HOUSING

(71) Applicants: Brose Fahrzeugteile GmbH & Co. Kommanditgesellschaft, Würzburg, Würzburg (DE); Schürholz GmbH & Co. KG Stanztechnik, Plettenberg (DE)

(72) Inventors: Alexander Kifer, Mistelbach (DE); Dominik Füller, Würzburg (DE); Angelo Castrignano, Plettenberg (DE); Andreas Blankl, Bischberg (DE); Martin Stiller, Waldsolms (DE); Patrick Thurmann, Würzburg (DE); Stefan Wortmann, Plettenberg (DE); Heiko Bömer, Plettenberg (DE)

(73) Assignees: Brose Fahzeugteile GmbH & Co. Kommanditgesellschaft, Wüurzburg, Wüurzburg (DE); Schürholz GmbH & Co. KG Stanztechnik, Plettenberg (DE)

(*) Notice: Subject to any disclaimer, the term of this patent is extended or adjusted under 35 U.S.C. 154(b) by 0 days.

(21) Appl. No.: 16/780,032

(22) Filed: Feb. 3, 2020

(65) Prior Publication Data
US 2020/0328648 A1    Oct. 15, 2020

(30) Foreign Application Priority Data

| Apr. 9, 2019 | (DE) | .................. | 10 2019 205 065.4 |
| Apr. 9, 2019 | (DE) | .................. | 20 2019 102 032.6 |
| May 21, 2019 | (DE) | .................. | 10 2019 207 431.6 |

(51) Int. Cl.
*H02K 5/15* (2006.01)
*H02K 7/00* (2006.01)
(Continued)

(52) U.S. Cl.
CPC .............. *H02K 5/15* (2013.01); *H02K 7/006* (2013.01); *H02K 7/083* (2013.01); *H02K 15/14* (2013.01); *B23K 26/28* (2013.01); *B23K 2101/36* (2018.08)

(58) Field of Classification Search
CPC ........... H02K 7/006; H02K 15/14; H02K 5/15
(Continued)

(56) References Cited

U.S. PATENT DOCUMENTS

| 2004/0140728 A1* | 7/2004 | Dairi | ..................... H02K 5/04 310/89 |
| 2005/0031465 A1* | 2/2005 | Dreiman | ............. F04C 29/0085 417/356 |

(Continued)

FOREIGN PATENT DOCUMENTS

| DE | 102010043042 A1 | 5/2012 |
| DE | 102012222602 A1 | 6/2014 |

(Continued)

*Primary Examiner* — Jose A Gonzalez Quinones
(74) *Attorney, Agent, or Firm* — Brooks Kushman P.C.

(57) ABSTRACT

An electric motor, in particular for a motor vehicle, having a cylindrical motor housing and having a fastening flange, the motor housing having a housing shell which is open both on a first end side and on the opposite second end sides, the fastening flange being configured with a bearing seat, and the fastening flange being connected to the housing shell on the second end sides.

16 Claims, 3 Drawing Sheets

(51) Int. Cl.
  *H02K 15/14* (2006.01)
  *H02K 7/08* (2006.01)
  *B23K 26/28* (2014.01)
  *B23K 101/36* (2006.01)

(58) Field of Classification Search
  USPC ... 310/89, 91, 400–402, 406, 408, 410, 418, 310/420, 438, 40 mm, 81
  See application file for complete search history.

(56) References Cited

U.S. PATENT DOCUMENTS

2009/0127955 A1\* 5/2009 Kasai ................... H02K 5/1672
  310/90
2013/0255438 A1\* 10/2013 Kieninger ............ B23K 33/006
  74/606 R

FOREIGN PATENT DOCUMENTS

| DE | 102015207548 | A1 | | 10/2016 | |
|----|--------------|----|---|---------|---|
| DE | 102016008459 | A1 | | 2/2018 | |
| DE | 102016222815 | A1 | \* | 5/2018 | ........... H02K 5/1732 |
| DE | 102016222815 | A1 | | 5/2018 | |
| EP | 2644309 | A1 | \* | 10/2013 | ......... B29C 66/5432 |

\* cited by examiner

ELECTRIC MOTOR HAVING A MOTOR HOUSING

CROSS-REFERENCE TO RELATED APPLICATIONS

This application claims priority to German patent application Serial No. DE 10 2019 205 065.4 filed Apr. 9, 2019, DE 10 2019 102 032.6 filed Apr. 9, 2019, and DE 10 2019 207 431.6 filed May 21, 2019, the disclosures of which are hereby incorporated in their entirety by reference herein.

TECHNICAL FIELD

The present disclosure relates to an electric motor, for example an electric motor for use in a brake booster or brake force booster (brake assistant or brake accelerator) for a motor vehicle.

BACKGROUND

Adjusting systems which are driven or operated by electric motor as motor vehicle components, such as window lifters, seat adjustment means, door and sunroof drives, steering motors or radiator fan drives, and pumps and interior compartment fans or brake boosters (brake force boosters, brake assistants or brake accelerators) may include an electric drive with a controlled electric motor. For electric motor drives of this type, what are known as brushless electric motors (brushless direct current motor, BLDC motor) are increasingly being used, in the case of which the wear-susceptible brush elements of a rigid (mechanical) commutator are replaced by way of an electronic commutation of the motor current.

SUMMARY

A brushless electric motor may be configured as an electric three phase machine having a stator, such as a stator formed of a laminated stator core, having a number of stator teeth which are arranged, for example, in a star-shaped manner and support an electric rotary field winding in the form of individual (stator) coils or coil windings which for their part are wound from an insulating wire (coil wire). Here, the stator or the laminated stator core may include, for example, a stator yoke, into which a stator star which has the stator teeth is pressed. The coil windings are assigned with their coil ends to individual (motor) strands or (motor) phases, and are connected among one another in a predefined way (star or triangular connection).

The motor housing for an electric motor of this type may be produced by a deep drawn sheet metal pot and an output-side bearing plate, for example made from aluminum or from steel. The motor housing may include a fastening flange with a number of fastening openings for screw fastening to a transmission or to another housing.

A fastening flange is guided onto the end side of the housing bottom in a manner which bears against the latter, and is fastened to the latter in a non-positive and/or integrally joined manner. The fastening flange has a central shaft opening for leading through the output-side shaft end of the motor shaft. The fastening flange has a number of fastening points which are formed, for example, as stamped recesses and are configured, for example, as welding points for an integrally joined fastening. The fastening flange can have a number of flange or fastening brackets which project from the circumferential side.

The present disclosure may disclose an electric motor with a particularly suitable motor housing. For example, the motor housing may be produced in a simple and inexpensive manner and may be provided with a fastening flange.

According to one or more embodiments, the electric motor may include a motor housing and a fastening flange. The motor housing may be formed of a housing shell that may be open on a first end side and on an opposite second end side. The fastening flange may be connected to the housing shell on one of the end sides. The fastening flange may include a number of fastening points or openings outside the housing shell for establishing a flange connection to a transmission or another housing (drive or actuator housing).

The fastening flange may be configured with a bearing seat, that is to say the bearing seat is integrated into the fastening flange. The bearing seat may define a shaft leadthrough.

The fastening flange may be suitably formed in a plate-like manner as a flange plate. The bearing seat which serves to receive a shaft bearing for a motor or rotor shaft is expediently formed into the fastening flange. The fastening flange may be produced by way of deep drawing or formed as a stamped bent part, in which the bearing seat is made by way of forming. The bearing seat suitably extends axially into the housing shell. The fastening flange expediently forms the housing bottom of the motor housing.

In one or more embodiments, the housing shell of the motor housing may be welded to the fastening flange. As one example, the welded connection expediently surrounds the housing shell completely and may without interruptions on the corresponding (second) end side. Here, the welded connection bears against the fastening flange over the full circumference.

In another embodiment, the housing shell may have a step-shaped widened portion on the (first) end side which lies opposite the fastening flange. A bearing plate for a further shaft bearing may be expediently inserted into the housing shell into the widened portion on the first end side which lies opposite the fastening flange.

The motor housing may be suitable for an electric motor and may include a hollow-cylindrical (tubular) housing shell, that may have a circular cross section, and may be provided with a fastening flange (flange plate). The fastening flange may be plate-shaped and may be connected to the housing shell in the assembled state. A bearing seat that may include a shaft leadthrough may be provided.

As one example, the shaft leadthrough may be triangular. The triangular shape of the shaft leadthrough centers the motor shaft in the manufacturing process such as a bearing (for example a ball bearing) may be provided.

One or more advantages achieved by way of the present disclosure, may be that the motor housing including the fastening flange may be produced simply and inexpensively. As another example of an advantage, the motor housing may be formed such that it is particularly low weight. A reason for this is that firstly the housing shell first of all has no housing bottom in comparison with a pot-like, in particular deep drawn motor housing, and the fastening flange with the integrated bearing seat at the same time also forms the housing bottom of the motor housing.

The stability of the motor housing may be increased on account of the welded connection that may be formed by a laser (laser welding) between the housing shell and the fastening flange in the form of the flange plate. In comparison with spot welding, in the case of which a pot-like, deep drawn motor housing is connected to a flange plate by means of what is known as projection welding.

The costs for subsequent galvanizing of the motor housing may be comparatively low, in particular lower by approximately 20% than in the case of a pot-like, deep drawn motor housing with a spot welded flange plate.

BRIEF DESCRIPTION OF THE DRAWINGS

In the following text, one exemplary embodiment of the invention will be described in greater detail on the basis of a drawing, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

DE 10 2012 222 602 A1 has disclosed an electric motor, in the case of which the fastening flange and the motor housing are configured in two pieces. A motor shaft is mounted in the motor housing such that it can be rotated about a rotational axis. The fastening flange which is produced from sheet metal has a central cutout, by means of which it is pushed axially onto the outer circumference of the motor housing. The pushed-on fastening flange is subsequently fastened to the outer circumference of the motor housing in an integrally joined manner by means of welding.

DE 10 2016 222 815 A1 has disclosed a transmission actuator having a brushless electric motor with a pole pot-like motor housing which is open on both end sides, a motor shaft which is mounted in the latter, and an electronics housing. On its first end side, the motor housing has a tube-shaped housing extension which, for fastening to a transmission housing, is plug-fastened in a separate fastening flange which is fastened to the transmission housing, in the manner of a press fit.

DE 20 2016 008 459 U1 has disclosed an electric motor which is suitable and set up, in particular, for use in a motor vehicle. The electric motor which is preferably of brushless configuration comprises a stationary stator with a rotary field winding and a rotatably mounted rotor which is surrounded by the former and is coupled fixedly to a motor shaft. The stator and the rotor are received in a pole pot-like motor housing which has an end-side housing bottom and a bearing plate (bearing cover) which is arranged on the opposite end side for mounting the motor shaft. The housing bottom has a receptacle as a bearing seat with a central shaft opening. The motor shaft is mounted on the output side in a bearing of the bearing seat, which bearing is configured as an anti-friction bearing or as a plain bearing. The housing bottom which is arranged so as to lie opposite the (in particular, B-side) bearing plate, is configured as a single-piece (A-side) bearing plate of the motor housing.

Parts and sizes which correspond to one another are always provided with the same designations in all the figures.

Figure 1:
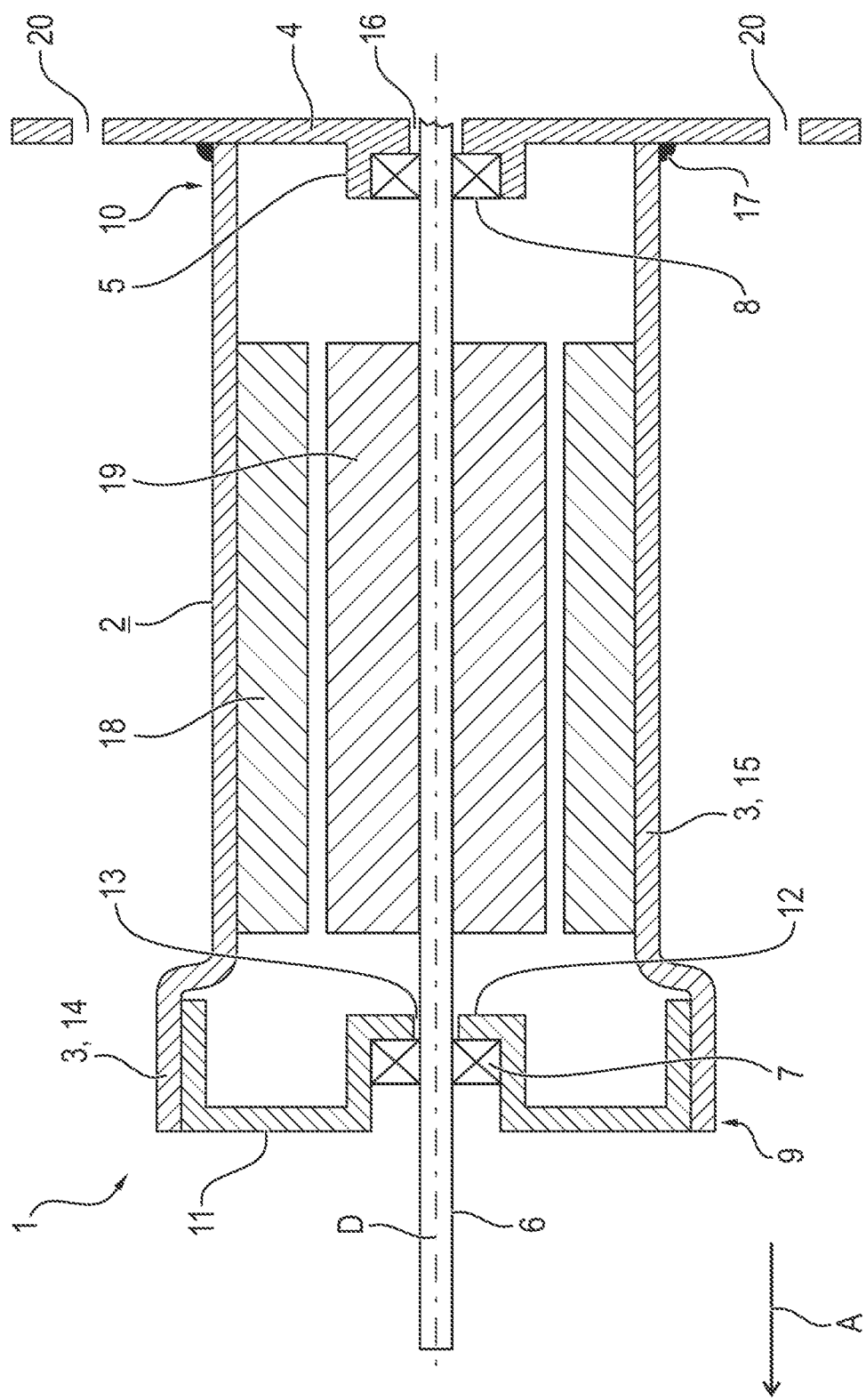
FIG. 1 diagrammatically shows a sectional illustration of an electric motor having a motor housing with a housing shell and with a fastening flange which is connected to the latter with an integrated bearing seat, and with a bearing plate which is inserted into the housing shell on the end side.

FIG. 1 shows an electric motor 1 of a motor vehicle, in particular of an electric motor adjustment drive or an actuator. The electric motor 1 may be brushless and include a motor housing 2 which is assembled from a hollow-cylindrical (tubular) housing shell 3 and a fastening flange 4 which is also called a flange plate in the following text. The plate-shaped fastening flange (flange plate) 4 has a bearing seat 5. The latter may be integrated into the fastening flange 4.

As can be seen, a motor shaft 6 which runs in the axial direction A penetrates the motor housing 1. The motor shaft 6 is mounted such that it can be rotated within two end-side bearings 7 and 8 of the motor housing 1 about a motor or rotational axis D which is oriented along the axial direction A.

Those end sides 9 and 10 of the approximately cylindrical housing shell 3 which are oriented perpendicularly with respect to the axial direction A form a bottom side and an assembly side of the motor housing 4, which assembly side lies opposite the bottom side. The assembly-side end side is also called the first end side 9 in the following text, and the bottom-side end side is also called the second end side 10 in the following text.

On the first end side 9 of the housing shell 3, a bearing plate 11 with a central, deep drawn bearing seat 12 is inserted into the housing shell 3, which bearing seat 12 receives one of the two bearings 7, 8 (here, the bearing 7) and has a shaft opening or shaft leadthrough 13 for the motor shaft 6 or for a shaft journal.

Figure 2:
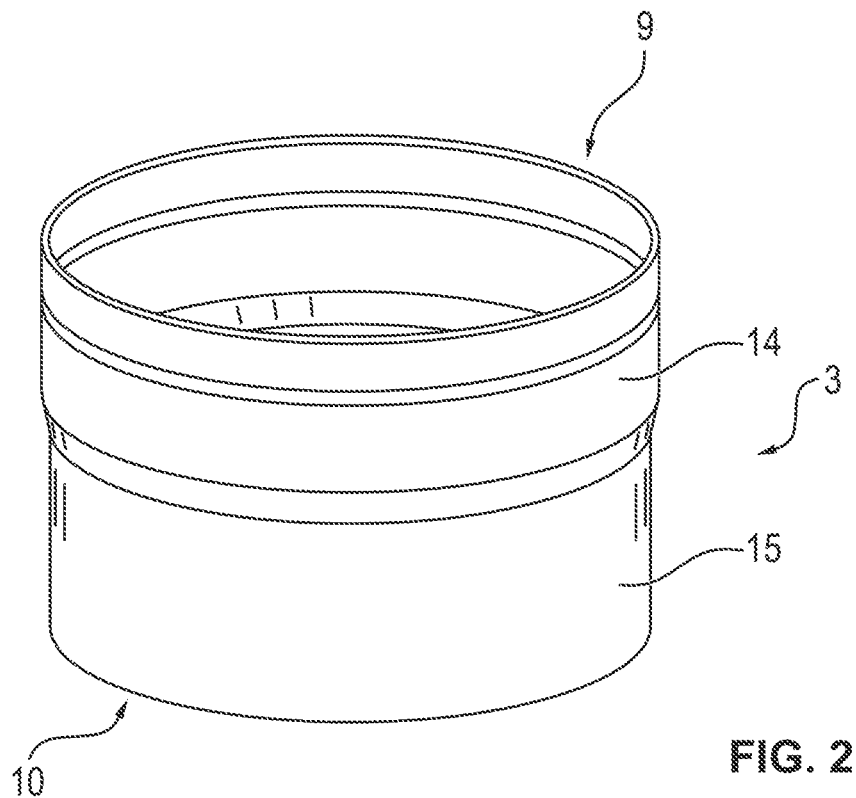
FIG. 2 shows a perspective illustration of the housing shell with a widened portion on an end side (shell end side) for receiving the bearing plate.

As can also be seen from FIG. 2, the housing shell 3 has a widened shell section 14 on the first end side 9 to this end, the internal diameter of which widened shell section 14 is greater than that of the remaining shell section 15 of the housing shell 3. The second bearing 8 is received into the central, deep drawn bearing seat 5 which protrudes into the housing shell 3, is made in the fastening flange (flange plate) 4 in a suitable manner by way of forming, and has a shaft opening or shaft leadthrough 16 for the motor shaft 6.

Figure 3:
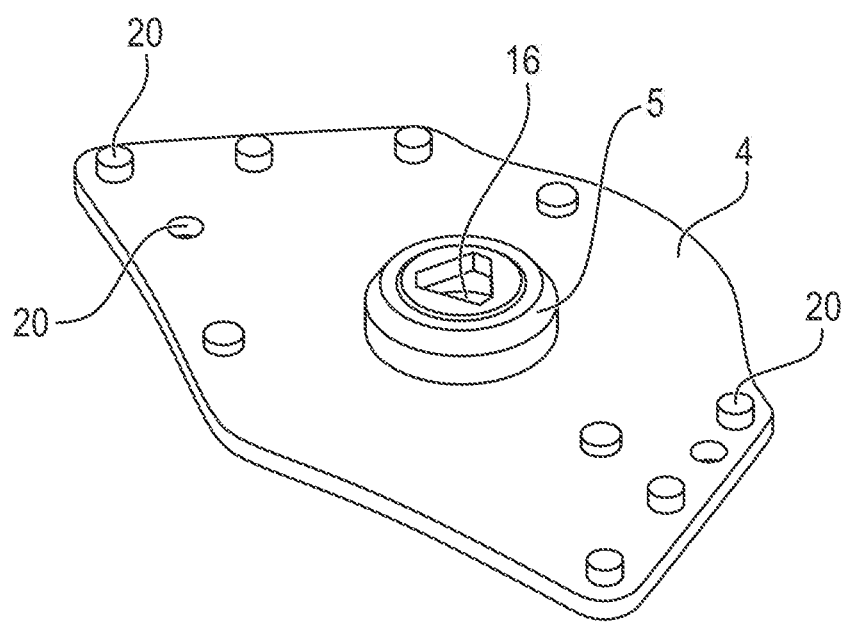
FIG. 3 shows a perspective illustration of the fastening flange as a flange plate with a bearing seat which is formed in it.

FIG. 3 shows the fastening flange (flange plate) 4 with an integrated bearing seat 5 in a perspective illustration with a view of that flange side, on which the housing shell 3 lies in order to connect it to the fastening flange 4 by way of the second end side 10. As can be seen, the shaft leadthrough 16 there is triangular. As a result, centering of the motor shaft 6 takes place during the manufacturing or assembly process. The centering function suitably takes place in terms of time and/or assembly before the bearing 8 there (such as a ball bearing) is inserted (assembled, joined).

Figure 4:
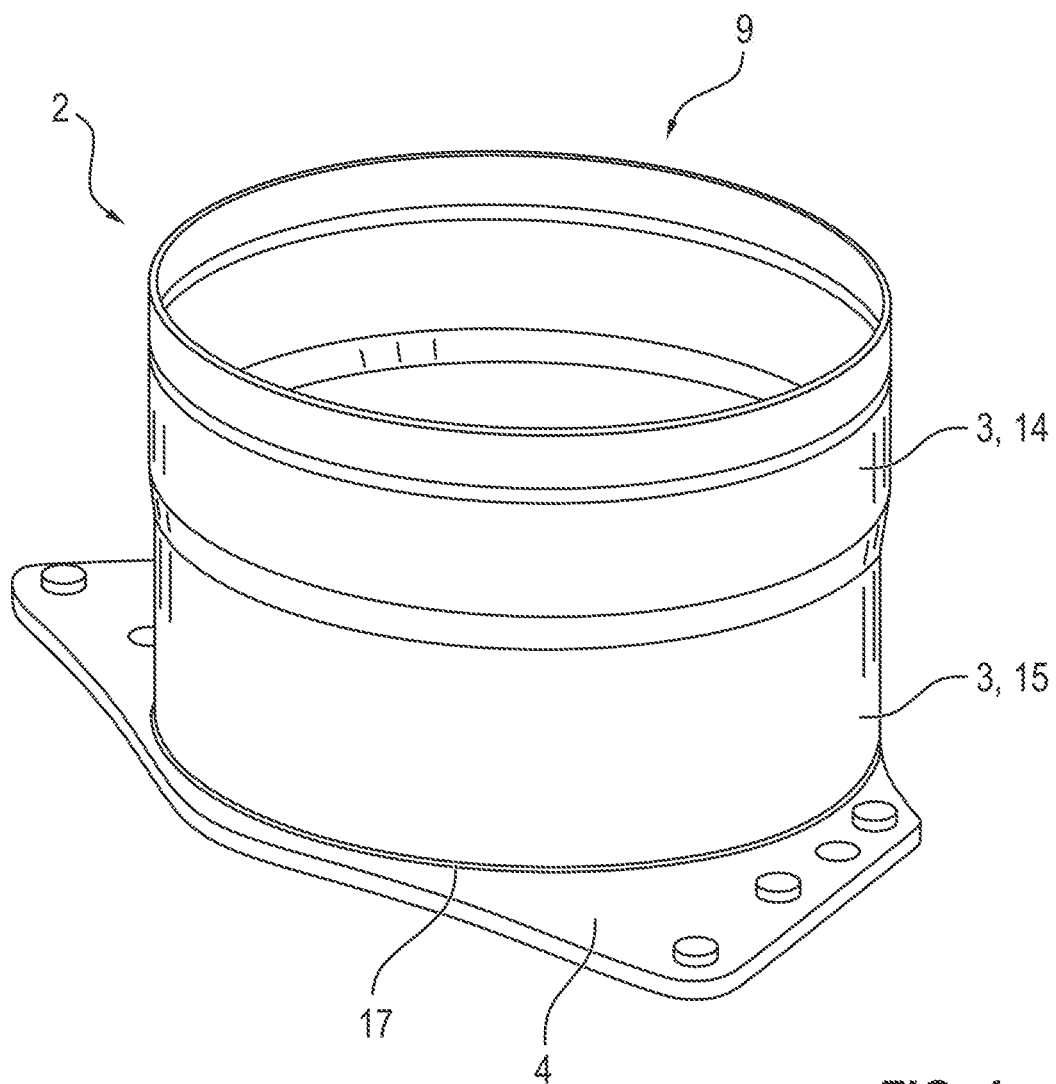
FIG. 4 shows a perspective illustration of the motor housing with a fastening flange which is welded onto the housing shell on the end side.

As can also be seen from FIG. 4, the hollow-cylindrical housing shell 3 and the fastening flange (the flange plate) 4 may be welded to one another by means of laser. The welded connection (welded seam) 17 to the fastening flange (to the flange plate) 4 is provided on the second end side 10 of the housing shell 3, by way of which end side 10 the housing shell 3 stands as it were on the fastening flange 4. The welded connection 17 may be completely circumferential (around the end side 10 or around the housing shell 3 on the end side 10) configuration. In the connecting state of the housing shell 3 to the fastening flange 4, it forms as it were the housing bottom or the bottom plate of the motor housing 2.

The electric motor 1 is suitably a brushless, electronically commutated electric motor with a stator 18 which is fixed on the housing and supports a rotary field winding, and with a permanently excited rotor 19 which is fixed on the shaft. By means of the fastening flange 4, the electric motor 1 is fastened to a housing or the like. To this end, the fastening flange 4 can have a number of fastening points 20, for example in the form of pins, openings or passages with an internal thread. The electric motor 1 can be coupled to a transmission or the like on the opposite output side, on which the motor shaft 6 protrudes out of the motor housing 2.

The invention is not restricted to the above-described exemplary embodiments. Rather, other variants of the invention can also be derived herefrom by a person skilled in the art, without departing from the subject matter of the invention. In particular, furthermore, all the individual features which are described in conjunction with the exemplary embodiments can also be combined with one another in another way, without departing from the subject matter of the invention.

The electric motor 1 may be suitable for use as a brake booster (brake force booster) of a motor vehicle. In addition, the described electric motor 1 and, in particular, the described motor housing 2 can be used not only in the stated, preferred application, but rather also in a similar embodiment in other motor vehicle applications, such as in the case of door and tailgate systems, in the case of window lifters, in the case of vehicle locks, in the case of adjustable seat and interior compartment systems, in the case of air conditioning compressors which are operated electrically (by electric motor), and in the case of electric drives, controllers, sensors and the arrangement thereof in the vehicle.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF DESIGNATIONS

1 Electric motor
2 Motor housing
3 Housing shell
4 Fastening flange/flange plate
5 Bearing seat
6 Motor shaft
7,8 Bearing
9 First end side
10 Second end side
11 Bearing plate
12 Bearing seat
13 Shaft opening/shaft leadthrough
14 Widened shell section
15 Shell section
16 Shaft opening/shaft leadthrough
17 Welded connection/welded seam
18 Stator
19 Rotor
20 Fastening point
A Axial direction
D Motor axis/rotational axis While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electric motor for use in a motor vehicle, the electric motor comprising:
   a cylindrical motor housing;
   a fastening flange formed in a plate-like manner as a flange plate, wherein the fastening flange forms a bearing seat defining a triangular shaft leadthrough; and
   a housing shell including a first end side and a second end side, opposite the first end side, wherein the first end side and the second end side are each open, the fastening flange is connected to the second end side of the housing shell by a weld seam bearing against the fastening flange over a full circumference of the housing shell, and wherein the fastening flange is connected to the housing shell on the second end side.

2. The electric motor of claim 1, wherein the weld seam is a laser weld seam.

3. The electric motor of claim 1, wherein the fastening flange is a bent part formed by stamping or by deep drawing.

4. The electric motor of claim 1, wherein the fastening flange includes a number of fastening points disposed outside the housing shell.

5. The electric motor of claim 1, wherein the first end side is wider than the second end side, wherein the first end side is opposite the fastening flange.

6. The electric motor of claim 1, further comprising a bearing plate, wherein the bearing plate is inserted into the first end side of the housing shell.

7. The electric motor of claim 1 further comprising a shaft extending through the shaft leadthrough.

8. A motor housing for use in an electric motor, the motor housing comprising:
   a hollow-cylindrical housing shell; and
   a plate-shaped fastening flange connected to the housing shell by a weld seam extending around a full circumference of the hollow-cylindrical housing shell and including an integrated bearing seat defining a triangular-shaped shaft opening.

9. The motor housing of claim 8, wherein the hollow-cylindrical housing shell includes a first end and a second end, opposite the first end, wherein the first end is wider than the second end.

10. The motor housing of claim 9, further comprising a bearing plate, wherein the first end receives the bearing plate.

11. An electric motor comprising:
    a housing shell including a first end and a second end and extending in a first direction, wherein the first end and the second end are each open and the first end is wider than the second end;
    a fastening flange having a substantially planar shape fixed to the second end of the housing shell by a weld seam extending around a circumference of the housing flange, wherein fastening flange extends in a second direction orthogonal to the first direction and forms a first bearing seat, wherein the first bearing seat defines a triangular-shaped shaft opening; and a bearing plate disposed in the first end of the housing shell, wherein the bearing plate forms a second bearing seat, wherein the first bearing seat and the second bearing seat are configured to receive a shaft of the electric motor.

12. The electric motor of claim 11, wherein the weld seam is a laser weld seam.

13. The electric motor of claim 11, wherein the first bearing seat is formed by a protrusion extending from a plate portion of the fastening flange formed by stamping.

14. The electric motor of claim 11, wherein the protrusion extends from the plate portion towards the first end.

15. The electric motor of claim 11, wherein the fastening flange includes a number of fastening points disposed outside of a circumference of the housing shell.

16. The electric motor of claim 11 further comprising a shaft extending through the triangular-shaped shaft opening.

* * * * *